United States Patent [19]

Franz

[11] Patent Number: 5,958,263
[45] Date of Patent: Sep. 28, 1999

[54] STUD WELDING METHOD

[75] Inventor: Udo Franz, Magdeburg, Germany

[73] Assignee: HBS Bolzenschweiss Systeme GmbH, Dachau, Germany

[21] Appl. No.: 08/861,501

[22] Filed: May 22, 1997

[30] Foreign Application Priority Data

May 23, 1996 [DE] Germany .............................. 196 20 774

[51] Int. Cl.[6] .................................................. B23K 9/20
[52] U.S. Cl. ...................................................... 219/99
[58] Field of Search ................................ 210/99, 98, 109, 210/110, 130.01, 130.21

[56] References Cited

U.S. PATENT DOCUMENTS

| | | | |
|---|---|---|---|
| 3,064,119 | 11/1962 | Glorioso | 219/98 |
| 4,456,810 | 6/1984 | Schumacher et al. | 219/110 |
| 4,797,529 | 1/1989 | Schmitt et al. | 219/99 |
| 5,406,044 | 4/1995 | Killian et al. | 219/99 |
| 5,676,867 | 10/1997 | Allen | 219/99 |

FOREIGN PATENT DOCUMENTS

| | | |
|---|---|---|
| 0 100 787 B1 | 2/1984 | European Pat. Off. . |
| 195 30 416 C2 | 2/1996 | Germany . |

*Primary Examiner*—Clifford C. Shaw
*Attorney, Agent, or Firm*—Foley & Lardner

[57] ABSTRACT

To evaluate the quality of a weld produced by a stud welding process, the time characteristic of the resistance R (t) between the stud and the workpiece is determined. If the resistance or the increase in resistance or the rate of increase of the resistance exceeds a predetermined value during the arc period, this is an indication of arc blow effects, of spattering, and of the arc burning outside the bonding area—effects which impair the quality of the weld. Upon detection of a predetermined resistance increase, the weld process is terminated by turning off the weld current or by immediately immersing the stud into the melt of the workpiece. Alternatively, the characteristic of the resistance over time detected in a first welding process can be used to set the parameters for subsequent welding processes.

15 Claims, 1 Drawing Sheet

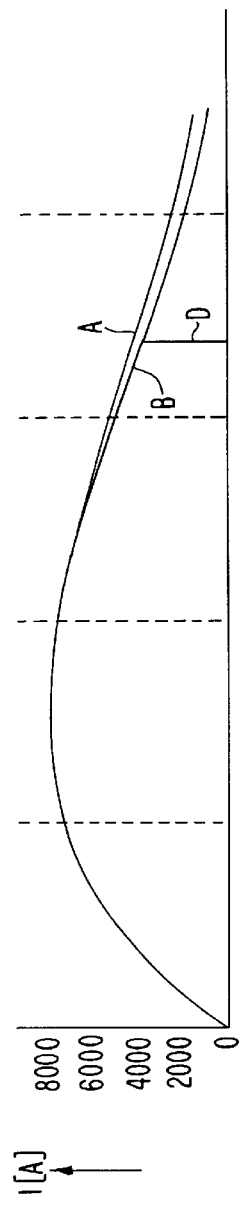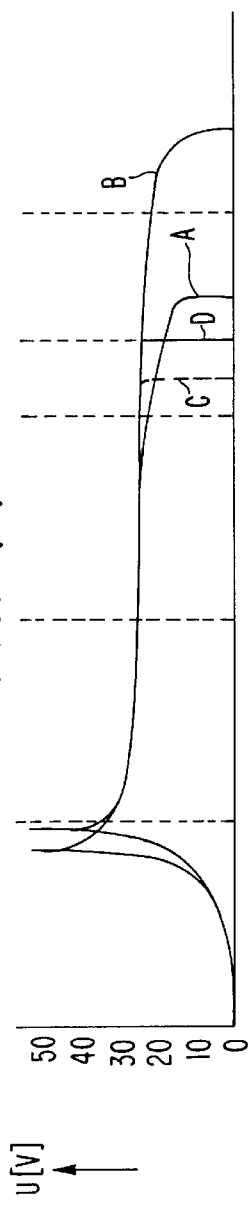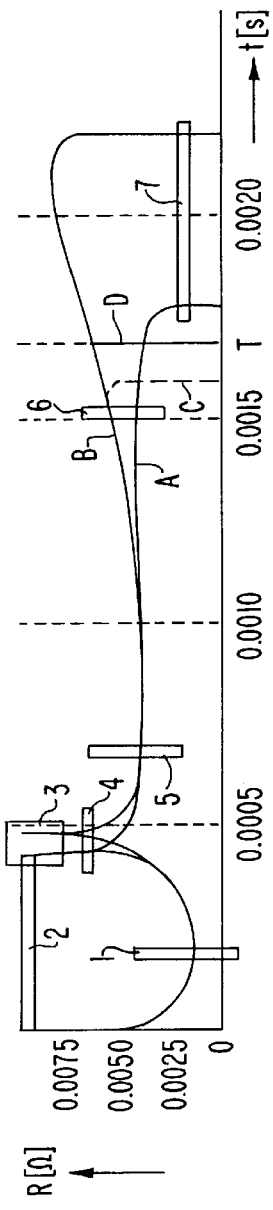

STUD WELDING METHOD

BACKGROUND OF THE INVENTION

The invention relates to a method for objectively evaluating welded bonds produced by tip or lift-off arc ignition welding processes, between a metallic piece, e.g. a welding stud, and a metallic workpiece.

European Patent Specification 0,100,787 discloses a stud welding process with tip arc ignition in which the characteristics of current and voltage over time and the stud movement are recorded, and the pressure of the welding sound is measured. Characteristics of the welding process, such as the moments of tip contact, of tip explosion and of stud shorting, the current maximum, the stud immersion depth and the like, are derived from the detected values. These characteristics are compared to empirically obtained values, and the degree of deviation is used as a basis for judging the quality of the weld.

German Patent Specification 19,530,416 discloses a similar method in which, in addition to the welding current and voltage, the magnetic field surrounding the arc is detected by means of a magnetic sensor. Information concerning the current distribution within the arcing zone and arc blow effects are obtained from the magnetic field measurement.

The known processes require a plurality of different values characteristic of the welding process to be detected and evaluated for drawing conclusions concerning the welding quality. Moreover, the evaluation is restricted to the coincidence between the results of the measurements and values obtained at one or a plurality of preceding test welds, and a plurality of measurement points are employed for determining the degree of coincidence. Due to the measuring equipment and time required, the known methods are expensive and cumbersome.

Since the various parameters measured are interdependent in a complex way, the results obtained are difficult to interpret and only to a limited extent useful. This becomes apparent parent by the fact that recent attempts to improve the reliability of the results take more and more measurements.

The simultaneous evaluation of a plurality of measurements requires well-trained personnel and considerable expenditure concerning the adjustment and monitoring of parameters. This is also one of the reasons why the known methods are unsuited for immediately influencing a current welding process.

SUMMARY OF THE INVENTION

It is an object of the invention at least partly to overcome such difficulties as occur in the prior art.

It is a more specific object of the invention to make available a faster, more accurate and more meaningful evaluation of a weld.

It is still another object to control a welding process while it is being carried out, to improve the resulting bond.

In view of the above objects, the invention provides a method for welding a part to a workpiece wherein the time characteristic of the resistance between the part to be welded and the workpiece is detected.

It has been found that the welding process can be judged by referring to the resistance characteristic substantially more readily and accurately than by separately considering and evaluating the current and voltage characteristics.

For one reason, the current characteristic is determined only by the inductive circuit parameters and by the energy and capacity of the capacitor battery used for forming the arc, while features and events of the arc have only marginal effect on the current characteristic. Although the voltage characteristic better reflects the welding process, it is—if considered alone—of only limited value for judging the process.

On the other hand, the resistance characteristic not only reflects all parameters that can be derived from the individual current and voltage characteristics, so that the number of measurements required to judge the welding process is already reduced; it also yields criteria that cannot be recognized from the individual current and voltage characteristics.

BRIEF DESCRIPTION OF THE DRAWING

In the drawing, FIG. 1(a) represents the time characteristic of the welding current I (t), FIG. 1(b) represents the voltage U (t), and FIG. 1(c) represents the resistance R (t), for two different welding processes A and B.

DESCRIPTION OF PREFERRED EMBODIMENTS

As shown in the diagram, the two welding processes A and B hardly differ in their current characteristics. Also, the voltage characteristics are qualitatively the same in both cases, with only slight differences in time concerning the ignition of the arc and the time the part to be welded is immersed into the melt of the workpiece (voltage dripping to zero).

However, the characteristics of the resistance over time shown in the lower diagram are significantly different for the two welding processes. More specifically, a conspicuous resistance increase takes place in the welding process identified by B.

This increase in resistance signifies strongly increasing splattering of molten metal and a burning of the arc outside the bonding area. By referring to the resistance characteristic, arc-blow effects can be clearly detected without any additional magnetic field measurements required in the prior art. All such phenomena accompanying an increase in resistance have a negative effect on the resulting bond. The more the resistance increases toward the end of the welding process, the lower is the quality of the weld.

The detection of the resistance may be used to control the process in such a way that the welding process is terminated when a predetermined resistance value, or a predetermined increase in resistance, or a predetermined rate of increase in resistance is exceeded. The termination may be made by queching the arc by immediately immersing the part to be welded (e.g. the stud) into the melt (as indicated by curve C in the diagrams) or by reducing or turning off the welding current (as indicated by curve D). A commuting switch connected in parallel to the arc may be used for turning off the welding current. It is also possible to apply both measures, i.e. to extinguish the arc and to reduce the welding current, simultaneously.

Optimal results are achieved when the resistance value is substantially constant or drops slightly during the arcing period, as is the case in the welding process A. Any extension of the arcing time will deteriorate the quality of the weld.

In addition to detecting the resistance, e.g. at the location 6, or the increase in resistance, e.g. by comparing the values obtained at the locations 6 and 5, the following evaluation may be made by referring to the resistance characteristic R (t):

At location 1, material properties of the stud and premature arc ignition may be recognized.

The characteristic of the resistance within region 2 permits conclusions concerning the geometry of the tip of the workpiece.

The value of the resistance at location 5 is characteristic of the welding gap and welding energy.

Observing the resistance characteristic with region 7 permits judgements concerning the kinematics and force of the stud movement, and the energy converted during the arcing phase.

As explained above, the detection of the resistance may be used for controlling the welding process being performed by terminating the process at the most appropriate moment. It is also possible to use results obtained in a first welding process for setting the parameters for subsequent weldings of similar studs to similar workpieces. Assuming the welding energy to be unchanged, a subsequent welding process may be influenced for instance by increasing the force of a spring which propels the stud against the workpiece. As a result, the invention for the first time makes a controlled welding process available.

For further optimising the process control, it may be useful—in addition to the resistance characteristic—to monitor the stud movement in order to detect the kinematics and force of the stud movement during the bonding phase, which have an influence on the welding result.

What is claimed is:

1. A method of stud welding a part to a workpiece, comprising the steps of:
   (a) contacting said part to said workpiece;
   (b) feeding a current through said part to said workpiece so that an arc builds between said part and said workpiece to fuse an area portion of said part to a facing area portion of said workpiece;
   (c) detecting a time characteristic of a resistance between said part and said workpiece; and
   (d) pressing said part and said workpiece against one another so that said fused parts solidify, wherein said time characteristic is used to evaluate a quality of a finished weld.

2. A method of stud welding a part to a workpiece as claimed in claim 1, wherein said time characteristic is used to control the stud welding method.

3. The method of claim 2 wherein said controlling includes terminating the welding process when said resistance exceeds a predetermined value during the arcing period.

4. The method of claim 3 wherein the welding process is terminated by reducing the welding current.

5. The method of claim 3 wherein the welding process is terminated by immediately immersing said part into a melt formed on said workpiece.

6. The method of claim 2 wherein said controlling includes terminating the stud welding process when the increase of said resistance exceeds a predetermined value during the arcing period.

7. The method of claim 6 wherein the welding process is terminated by reducing the welding current.

8. The method of claim 6 wherein the welding process is terminated by immediately immersing said part into a melt formed on said workpiece.

9. The method of claim 2 wherein said controlling includes terminating the welding process when a rate of increase of said resistance exceeds a predetermined value during the arcing period.

10. The method of claim 9 wherein the welding process is terminated by reducing the welding current.

11. The method of claim 9 wherein the welding process is terminated by immediately immersing said part into a melt formed on said workpiece.

12. The method of claim 1 wherein said evaluating includes using said time characteristic of said resistance detected in a first welding process for setting a set of process parameters of subsequent welding processes.

13. The method of claim 12 wherein said method parameters are set to such values that an increase of said resistance upon ignition of the arc is avoided.

14. The method of claim 1 wherein the characteristic of said resistance over time is evaluated by detecting said resistance at between 3 and 15 measuring points.

15. The method of claim 1 wherein the kinematic behavior of said part is detected for evaluating the weld.

* * * * *